United States Patent [19]

Turner et al.

[11] Patent Number: 5,149,347
[45] Date of Patent: Sep. 22, 1992

[54] WATER SEPARATOR FOR FUEL CANISTER PURGE

[75] Inventors: Kenneth W. Turner, Webster; Patti S. Du Bois, Hamlin; Peter J. Alfred, Victor; Thomas W. Greer, Rochester, all of N.Y.

[73] Assignee: General Motors Corporation, Detroit, Mich.

[21] Appl. No.: 661,942

[22] Filed: Feb. 28, 1991

[51] Int. Cl.$^5$ ............................................. B01D 45/00
[52] U.S. Cl. ......................................... 55/446; 55/387
[58] Field of Search ........................ 55/446, 445, 387

[56] References Cited

U.S. PATENT DOCUMENTS

| | | | |
|---|---|---|---|
| 847,185 | 3/1907 | Kelly | 55/446 |
| 2,399,384 | 4/1946 | Pross | 55/445 |
| 4,371,563 | 2/1983 | Muehlberger | 55/446 |
| 4,589,852 | 5/1986 | Price | 55/446 |
| 4,693,393 | 9/1987 | DeMinco et al. | 220/374 |

OTHER PUBLICATIONS

Pp. 745-746 from book "Gas Purification Processes" by Gordon Nonhebel, published in 1964.

*Primary Examiner*—Bernard Nozick
*Attorney, Agent, or Firm*—Patrick M. Griffin

[57] ABSTRACT

The intake for a fuel vapor storage canister separates entrained water from the entering purge flow. A separator in the form of an open ended box includes a series of alternating, interleaved, and downwardly sloped fins, the free edges of which create a series of restricting gaps that decrease in size in the upstream direction. Each gap, for some defined subrange of the total possible range of flow rates, accelerates the flow into the fin above it at the optimal velocity for water stripping.

1 Claim, 1 Drawing Sheet

WATER SEPARATOR FOR FUEL CANISTER PURGE

This invention relates to automotive fuel emission control systems generally, and specifically to a separator to remove entrained water from the fresh air that is drawn from ambient and used to purge adsorbed fuel vapor from a storage canister.

BACKGROUND OF THE INVENTION

Vehicle fuel systems have long used activated carbon filled canisters to temporarily hold fuel vapors that would have been simply vented in years past. The stored vapors are desorbed from the carbon when the engine runs by using manifold vacuum to draw fresh air from ambient through the canister, and ultimately to the engine for burning. This process is generally referred to as purging, and the air drawn in referred to as purge air. In order to achieve maximum purge efficiency, purge air cannot be drawn in at a constant flow rate. Instead, various computer controls and valves are used to draw purge air at the maximum rate that can be handled by the engine under various conditions. While there is a known maximum to minimum total range of purge flow rates, the actual rate will vary continually. Another factor that can potentially affect efficiency is the fact that the purge flow may in fact be more than just air, including a significant percentage of entrained water in the form of a fine mist or droplets. While this is apparently not a well recognized problem, it is known that water in the carbon canister can adversely affect its fuel vapor adsorption capacity. In the future, even larger carbon canisters may have to be carried in vehicle locations where they will be subjected to higher water percentages in the purge inflow.

The problem of entrained water separation is recognized in the gas purification field. Louver type separators are known that pass the flow across an array of slats in such a way that it impinges upon the surface of the slats. The entrained water is stripped from the flow, collecting on the surface of the slats. It has been found that there is an optimal flow velocity, in the range of 7-10 feet per second, at which the stripped and collected water will not be picked up again by the passing flow. Therefore, it is a relatively simple matter to design the equipment so that the flow is drawn in at the optimal velocity. However, as noted above, that is not feasible in vehicle evaporative control systems, where the flow rate is variant.

SUMMARY OF THE INVENTION

The invention provides a separator for removing entrained water from the purge flow that is effective without providing a single inflow velocity.

In the embodiment disclosed, the separator includes an inflow chamber in the form of an open ended box that is fixed to the vehicle body with the open end at the bottom. A purge tube opens through the upper end of the box, and purge vacuum is applied thereto to draw a purge flow from ambient through the lower end. A series of four downwardly sloped fins is integrally molded inside the box, each with a free edge that terminates deliberately short of an opposed side wall, thereby creating a restricting gap. The fins are interleaved and alternated, so that the next fin in the series is above a gap. The fins are successively longer, so that the gaps they create decrease from bottom to top. Each gap is chosen so that its area will, for some subrange of entering flow rate, accelerate the flow to approximately the optimal velocity for water separation.

In operation, when purge is commenced, a flow from ambient is drawn in from ambient at whatever flow rate the purge program calls for. The purge flow enters the open box end, and then travels up and around the fins in series in a tortuous, serpentine path, passing through each successive gap before reaching the purge line at the top. The underside of each fin is exposed to the airflow that slips past the edge of the fin beneath, which impinges forcefully thereon. The entering flow is accelerated as it passes through each successively smaller gap. At some point, because of the way in which the gaps are deliberately sized, the flow velocity will approach the optimal separation velocity, the entrained water droplets will collect on the underside of the fin just above. Because of the downward fin slope, collected water can drain down, opposite to the purge flow direction. Since it faces an ever slower flow, the draining water will not be re-entrained, and can simply fall out the bottom.

It is, therefore, a general object of the invention to remove entrained water from the purge flow into a vehicle fuel vapor canister.

It is another object of the invention to provide such a separator that is not dependent on providing a single, constant rate of inflow to the separator.

It is another object of the invention to provide such a separator that uses a series of fins on which the flow successively impinges, and a series of successively decreasing gaps through which the flow must pass, thereby successively accelerating the flow so that the flow impinging on some fin can be expected to approximate the optimal velocity for water separation.

It is another object of the invention to provide such a separator in which the fins are arranged to allow the entrained water to drain down without being picked up again by the downstream flow.

DESCRIPTION OF THE PREFERRED EMBODIMENT

These and other objects and features of the invention will appear from the following written description, and from the drawings, in which.

Figure 1:
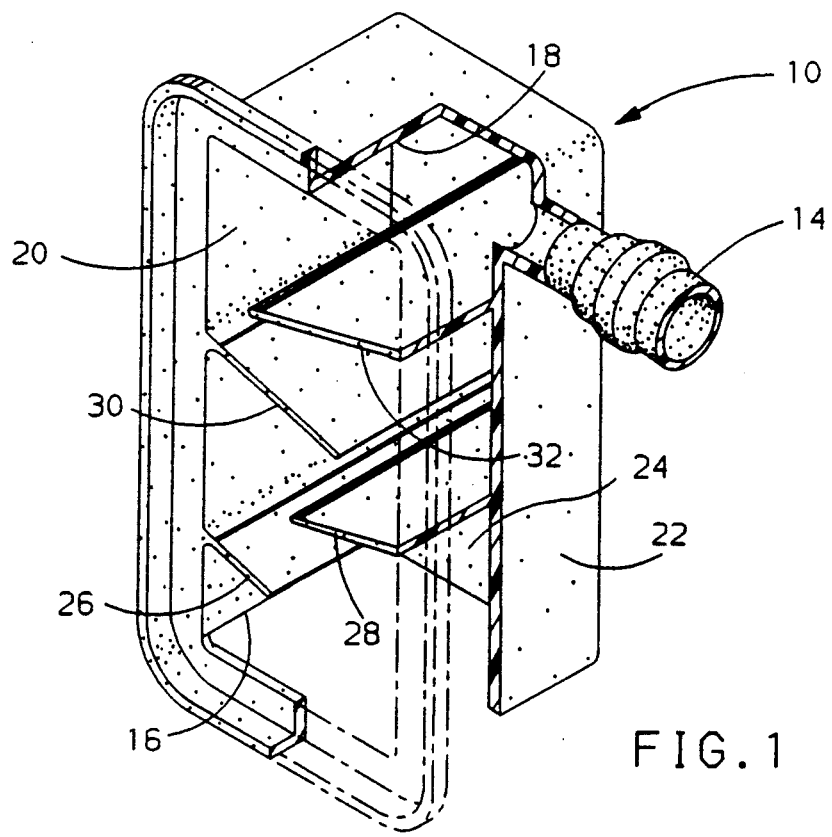
FIG. 1 is a perspective view of the separator with part of the box broken away.

Referring to the drawings, a preferred embodiment of the separator of the invention, indicated generally at 10, is used in conjunction with a vehicle fuel evaporation control system, the main component of which is an activated carbon canister 12. Canister 12 stores excess fuel vapors by adsorption, which are later purged when manifold vacuum draws fresh air in from ambient, through a purge line 14. The purge flow rate is deliberately varied by the vehicle's control system, so that as much vapor can be purged as the engine can handle at any point in time. A constant purge flow rate would be simpler to create, but not nearly so efficient. While the purge flow rate provided through purge line 14 varies, the total range over which it varies from maximum to minimum, can be predicted fairly closely. Separator 10 is designed on the basis of that known total range of purge flow rates.

Separator 10 is basically a rectangular, hollow box, molded of a suitably hard plastic, such as nylon. Although it is molded with an open side for ease of manufacture, as shown, that side of the box would be closed when mounted to the vehicle. Separator 10 is then totally sealed except for the open inlet 16 at one end and the opposite end surface 18, which receives the purge line 14. Separator 10 is mounted vertically, with inlet 16 at the bottom and end surface 18 at the top. Therefore, when vacuum is applied through purge line 14, a purge flow of air and whatever is mixed with the air is drawn through inlet 16 to purge line 14. The upstream direction of flow depends on the orientation of separator 10, and is upward as disclosed, counter to gravity. Inlet 16 is large enough so as not to substantially restrict the flow of ambient air that the vehicle's vacuum is able to draw in, and the pressure differential between purge line 14 and inlet 16 will not be great enough to cause any significant expansion or contraction of the air drawn in. So the predicted total range of flow rates through purge line 14 will be seen at inlet 16, as well. Separator 10 includes interior structure that works on the purge flow to remove any water entrained therein, described next.

Being a basic box, separator 10 has three side walls, 20, 22 and 24, all of which would be vertical when separator 10 was mounted. Molded integrally to the interior is a series of four fins, numbered 26 through 32 in ascending order, which are interleaved and alternating. That is, two fins, 26 and 30 are molded to side wall 20 and the center side wall 24, and the other two, 28 and 32, are molded to the center side wall 24 and the side wall 22 opposed to side wall 20. Fins 26-32 are substantially evenly spaced from one another in the vertical direction, and each is also sloped slightly downwardly, about fifteen degrees from horizontal. However, each fin is deliberately of different length, shorter than the fin above it. Thus, the free edge of each fin 26-32 is spaced from its opposite side wall 20 or 22 by an increasingly smaller amount, creating four different restricting gaps of successively decreasing size, numbered $X_1$ through $X_4$. Because of their alternating, interleaved relation, the underside of every fin except the first fin 26 faces the gap created by the fin below it, while first fin 26 directly faces inlet 16. When the separator 10 is mounted and its open side closed, there is no flow path available from inlet 16 to purge line 14 other than around the free edges of the fins.

Figure 2:
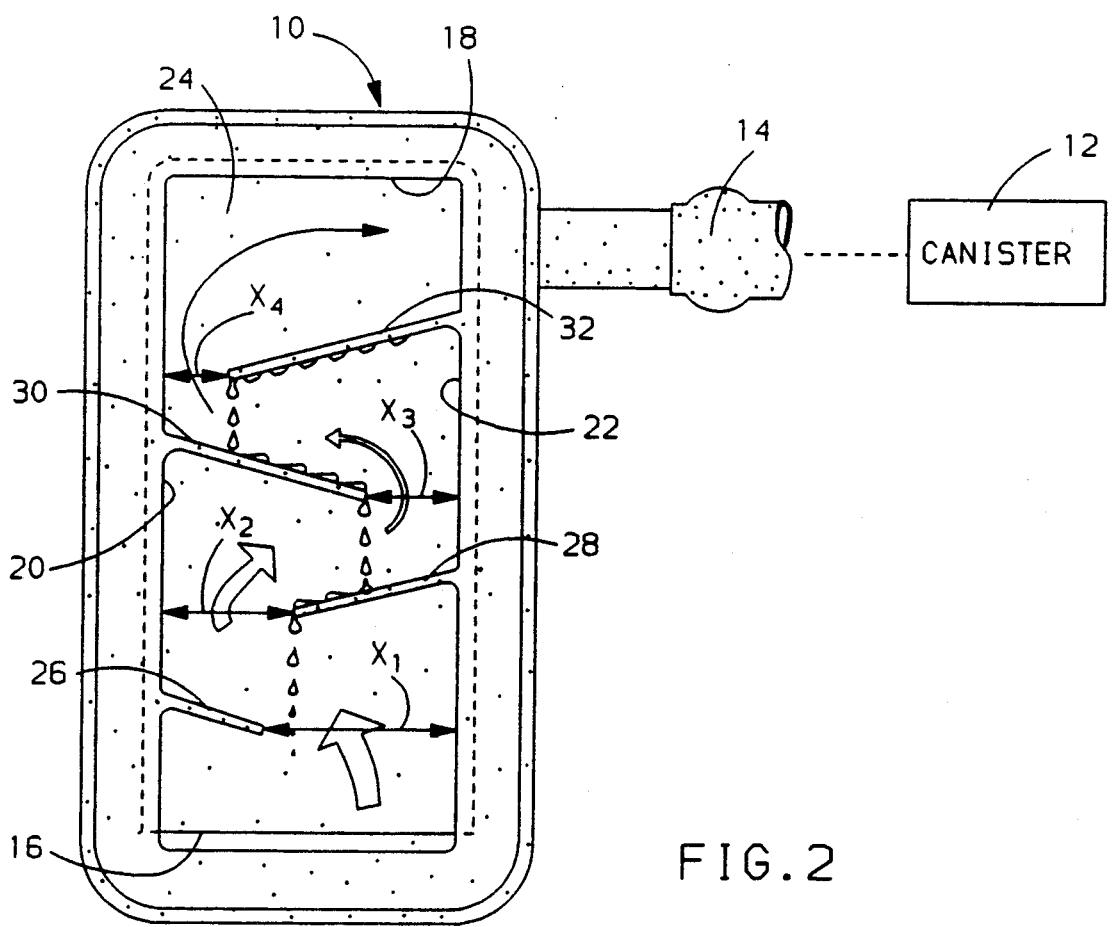
FIG. 2 is a side view of an open side of the box showing the flow direction.

Referring to FIG. 2, the operation of separator 10 is illustrated. When vacuum is applied at purge line 14, a purge flow is created that enters inlet 16, moving up and through each gap in a forced serpentine pattern. Since each successive gap is smaller, the purge flow will be restricted in area and its speed will be accelerated and increased as it slips past the free edge of each successive fin. This effect is visually represented by the narrowing and lengthening arrows. The flow through each gap will also be forced to impinge upon the underside of the fin just above it. If the flow velocity is within the optimal water stripping velocity range at that point, the entrained water droplets will collect on the underside of the fin upon which it impinges. Below that speed, the water is not stripped out, and above that speed, the water is picked back up and re-entrained. The gaps $X_1$-$X_4$ are sized so to assure that the optimal velocity is achieved through at least one gap, for any possible flow rate. The method of sizing the fins is described further below. As illustrated, the optimal stripping speed has been achieved as the flow slipped past the free edge of fin 30, through gap $X_3$, so it is the uppermost fin 32 that provides the collection surface. Because of the downward slope of fin 32, and of all the fins below it, the collected water droplets can drain down, landing on the upper side of each successive sloped fin 30-26, and ultimately out bottom inlet 16, as illustrated. Because the gaps successively increase in the downstream direction, the flow velocity that the draining water sees will be continually decreasing, and the water will not be blown back upstream and re-entrained. In addition, any dust mixed in the purge flow will collect on the fins as well, and be washed off with the draining water.

To achieve the operation described above, the various gaps $X_1$-$X_4$ are sized based on the predetermined total range of possible purge flow rates. The flow rate, in terms of volume per unit time, would be substantially the same at all points in the flow path, since there is no significant expansion or contraction of the air. The velocity of flow at any point in the flow path, in terms of length per unit time, will differ with the area of the flow path at that point. Therefore, the velocity or speed with which the flow passing through any gap impinges upon the fin above depends on the area of that gap. Knowing the total possible range of flow rates for the particular system, from minimum to maximum, and knowing that the optimal velocity for stripping water from the purge flow is about 7-10 feet per second, the designer chooses the area of each gap $X_1$-$X_4$ such that the optimal flow velocity range will be achieved over some calculated subrange of flow rates. For example, if the maximum expected flow rate is 70 liters per minute, it can be calculated that an area of 3.8 cm squared will yield a flow velocity of 10 feet per second. That area, in turn, will yield a speed of 7 feet per second when the flow rate is about 48 liters per minute. Therefore, if the largest gap $X_1$ is set at 3.8 cm squared, then it will create the optimal stripping velocity over a flow rate subrange of 70 to 48 liters per minute. The same process, starting with an upper limit of 48, is used to calculate $X_2$ and its particular flow rate subrange, and so on, until the subranges together add up to the total expected range of flow rates. The number of gaps necessary will vary with the breadth of the expected total range. In the particular embodiment disclosed, it will be noted that there is no fin directly above the last gap $X_4$. However, the flow at that point will impinge directly on the upper end surface 18, which will in effect act like another fin and provide a collection surface. Another option would be to size inlet 16 so as to serve as one of the gaps that creates the optimal flow speed. However, the lower fin 26 is short enough that its underside would not likely provide as efficient a collection surface as upper end surface 18.

Variations in the preferred embodiment could be made. The interior of the separator could be provided with a series of flow accelerating gaps that were structurally unrelated to the collection surfaces above them. That would be a more complex and less compact structure than the embodiment disclosed, where the free edge of each fin also cooperates to create the flow accelerating gap for the fin above. The vertical orientation of the separator and downward slope of the fins cooperate to create the self draining action described. Neither might be necessary if the amount of water anticipated was not great. Or, a horizontally oriented separator could be provided with small drain holes separate from the main inlet. This would mean that some flow would be drawn in from ambient other than just through the inlet, but the successively decreasing flow velocity through the series of gaps would still assure that collected water would not be re-entrained. Therefore, it will be understood that it is not intended to limit the invention to just the embodiment disclosed.

The embodiments of the invention in which an exclusive property or privilege is claimed are defined as follows:

1. In a vehicle having a fuel vapor canister through which a purge flow of air and entrained water droplets is forcibly drawn from ambient at a predetermined range of flow rates, a separator for removing said entrained water droplets from said purge flow, comprising, an inflow chamber formed by an opposed pair of side walls with a bottom inlet into which said purge flow is initially drawn upwardly between said side walls from ambient, and, a series of interleaved, downwardly sloped separator fins attached in alternating fashion to said side walls, each of said fins having a free edge spaced from its opposite side wall past which said flow slips before reaching the underside of the next fin in the series, said free edges thereby creating a series of restricting gaps with said opposite side walls, each of which is successively decreased in size in the upstream direction so as to accelerate said purge flow, when it is within a defined subrange of said predetermined range of flow, to the optimum velocity for the separation of said water droplets therefrom as it impinges on the underside of the next fin in the series, said separated water droplets facing decreasing flow velocity in the downward direction so as to be able to drain off said downwardly sloped fins and ultimately out of said bottom inlet.

* * * * *